United States Patent
Jessen et al.

(10) Patent No.: US 8,254,916 B2
(45) Date of Patent: Aug. 28, 2012

(54) METHOD FOR BLOCKING ROAMING-STEERING MECHANISMS

(75) Inventors: Peter Jessen, Bonn (DE); Tomas Lebl, Bonn (DE); Maik Kirsch, Sankt Augustin (DE)

(73) Assignee: T-Mobile International AG, Bonn (DE)

( * ) Notice: Subject to any disclaimer, the term of this patent is extended or adjusted under 35 U.S.C. 154(b) by 562 days.

(21) Appl. No.: 12/374,632

(22) PCT Filed: Jul. 7, 2007

(86) PCT No.: PCT/EP2007/006029
§ 371 (c)(1),
(2), (4) Date: Sep. 3, 2009

(87) PCT Pub. No.: WO2008/009359
PCT Pub. Date: Jan. 24, 2008

(65) Prior Publication Data
US 2009/0312015 A1    Dec. 17, 2009

(30) Foreign Application Priority Data
Jul. 19, 2006    (DE) .................. 10 2006 033 327

(51) Int. Cl.
H04M 3/42    (2006.01)
H04W 4/00    (2009.01)
(52) U.S. Cl. ............... 455/432.1; 455/414.1; 455/435.1; 455/435.2
(58) Field of Classification Search ............... 455/432.1, 455/433, 435.1, 435.2, 414.1
See application file for complete search history.

(56) References Cited

U.S. PATENT DOCUMENTS

| | | | |
|---|---|---|---|
| 7,693,506 B1 * | 4/2010 | Back et al. | 455/432.1 |
| 2004/0087305 A1 | 5/2004 | Jiang et al. | |
| 2006/0068778 A1 | 3/2006 | Della-Torre | |
| 2006/0111087 A1 * | 5/2006 | Leitgeb et al. | 455/414.1 |
| 2006/0246897 A1 * | 11/2006 | Jiang | 455/435.1 |
| 2006/0246898 A1 | 11/2006 | Jiang | |
| 2008/0108347 A1 * | 5/2008 | Jiang | 455/433 |

FOREIGN PATENT DOCUMENTS

WO    2006/085295 A1    8/2006
WO    2006/099388 A2    9/2006

OTHER PUBLICATIONS

"Digital Cellular telecommunications System (Phase2+)", ETSI Standards, European Telecommunications Standards Institute, Sophia-Antipo, France, Bd. 3-SA1, vol. 740, p. 7 para 3.2-p. 13 para 3.2.2.8, Jun. 2006, (XP14034180).

* cited by examiner

Primary Examiner — Dwayne Bost
Assistant Examiner — Bryan Pitt
(74) Attorney, Agent, or Firm — Browdy and Neimark, PLLC

(57) ABSTRACT

The invention relates to a method for blocking roaming steering mechanisms. According to said method, a foreign cellular device (3), e.g. a cellular telephone, is registered with nationally visited radio network (2) when the foreign (1) and the national cellular network operator have concluded a roaming agreement on mutually debiting cellular services. The invention is characterized in that an anti-roaming steering server (5) installed in the nationally visited cellular network (2) identifies manipulated error messages (14) and selectively manipulates the registration process (8) of foreign mobile users by adequately influencing signaling processes.

8 Claims, 3 Drawing Sheets

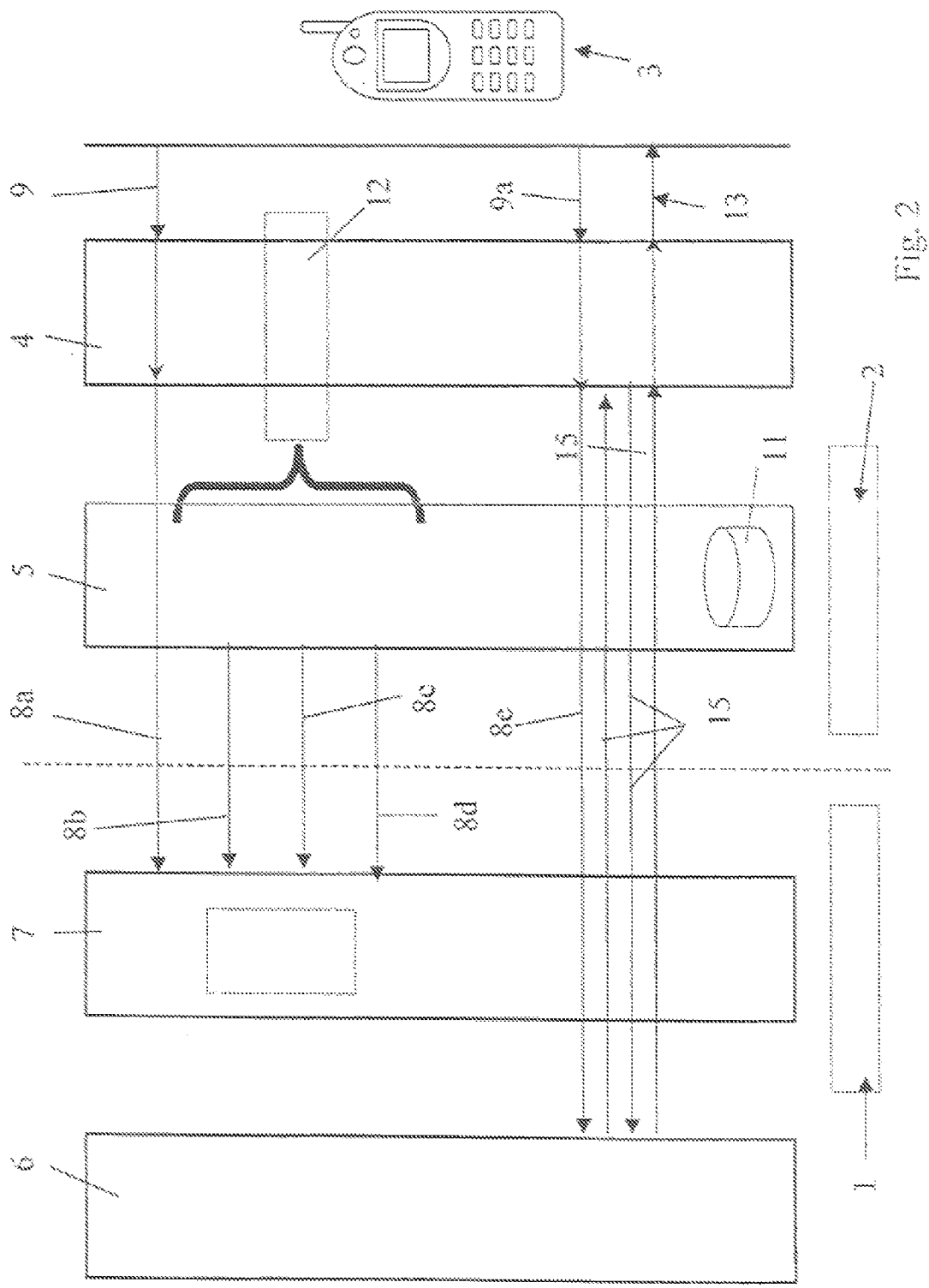

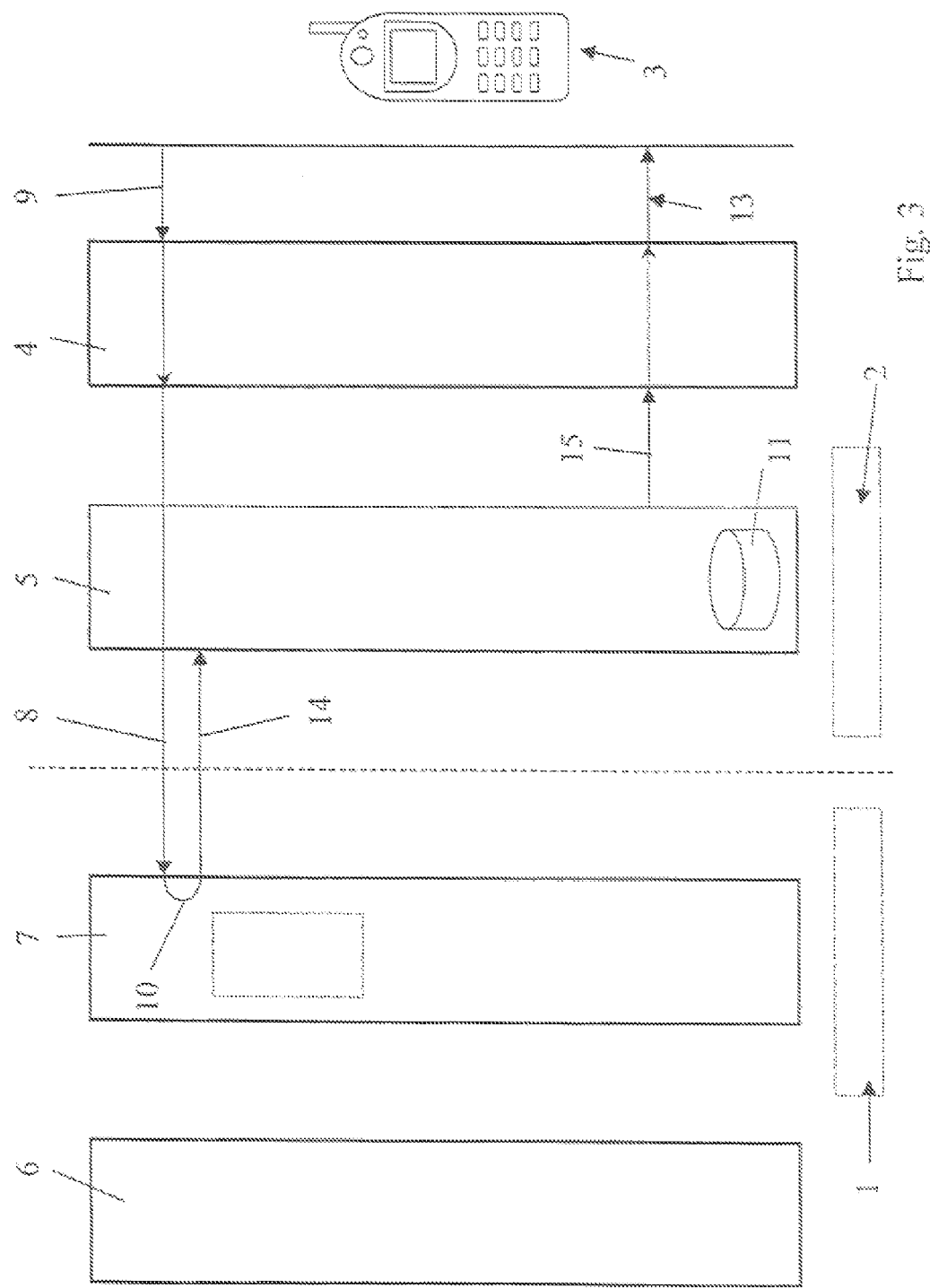

METHOD FOR BLOCKING ROAMING-STEERING MECHANISMS

The invention relates to a method for blocking roaming-steering mechanisms of an anti-roaming-steering server, wherein the method detects corrupt error messages and, by means of a suitable influence on the signaling processes, neutralizes a targeted manipulation of the registration process of foreign mobile users (roaming steering.)

It is known that, for example, a subscriber from a foreign mobile radio network, in order to be able to utilize mobile radio functions, registers with one of the mobile networks of the national mobile network operators.

Generally, the roaming process makes it possible to use a mobile user terminal, such as, for example, a cellular telephone, in a foreign mobile network.

This is possible only if a so-called roaming agreement exists between the foreign and the national mobile network operator for mutual billing of services.

An additional prerequisite for performing the roaming process is the permission for a cellular visitor to register with a corresponding mobile network of the visited country.

Agreements of this type are called roaming agreements.

One mobile network that is configured for the registration of such visiting cellular customers with a national, for example German, mobile network is the mobile network of the mobile network operator T-Mobile International AG.

However, the inventive method that is described here shall not be limited exclusively to the mobile network of T-Mobile International AG. Rather, this method can be applied also in other known mobile networks.

A registration process of a mobile device of a preferably foreign mobile network with a national mobile radio network is referred to in the technical jargon as "Location Update."

In the process, a customer from a mobile network operator's non-national mobile network registers with a VLR (visitors location register).

To perform such a registration process, an Update Location message is sent from the visited VLR (visitors location register) to the HLR (home location register (GSM)).

This message then triggers an Update Location procedure in the HLR, causing the subscriber data set to be transmitted from the HLR to the VLR.

If the procedure is completed successfully, the Update Location message is successfully acknowledged by the HLR.

Such an Update Location method is known in the prior art and is described in detail in the specification 3GPP TS 29.002 for a Mobile Application Part signaling protocol.

It is also known that a foreign mobile network operator gives higher national priority to other existing roaming agreements, such as, for example, roaming agreements of its own associated mobile radio service companies.

Of course, the foreign mobile network operator is interested in having its customers register preferably in its higher-prioritized mobile networks in the visited country.

According to the applicable EU guidelines it is left up to the cellular customer in which foreign mobile network he registers when he is abroad.

In order to steer the registrations of a mobile network operator's own customers in foreign mobile networks, mobile network operators employ so-called roaming-steering servers that exert direct influence on the signaling.

In the process, the registration with lower prioritized networks is made more difficult and the likelihood of the registration with higher prioritized networks is thereby increased.

US 2006/068778 A1 discloses a method for blocking roaming-steering mechanisms, wherein the method carries out a registration of a foreign mobile device with a visited national mobile network if a roaming agreement exists between a foreign and a national mobile network operator for mutual billing of mobile radio services. The foreign mobile device sends, during its registration, a query in the form of a Location Update message to the visited national mobile network. A redirection blocker that is installed in the visited national mobile network detects a manipulation or redirecting of the Location Update message by a roaming-steering server in the foreign mobile network and prevents it so that the mobile unit can register with the visited national mobile network.

It is the object of the present invention to increase the registration of mobile network subscriber [sic] with an own mobile network abroad, so as to keep the outbound roaming traffic within own mobile network participations in foreign mobile network operators.

To meet this object, the invention is characterized by the characteristics of claim 1

Preferred embodiments of the invention are specified in the subclaims.

The invention will be described below with the aid of a number of exemplary embodiments of the subject matter of an anti-roaming steering process that specify and illustrate the mode of action of the anti-roaming-steering server.

The invention is not limited, however, to the described exemplary embodiments of the implementation of such a method. Rather, all anti-steering methods are claimed according to the invention that are attained either individually or from the combination of the exemplary embodiments described herein.

It is essential for carrying out an anti-steering method that a profile of measures is stored in a database of the anti-steering server and monitors whether an anti-steering process is being performed, at what time, and in which form.

The method has the basic process steps that are described below:

The mobile device (cellular telephone) repeats an Update Location four times, should a rejection occur on the MAP (mobile access protocol) signaling.

Such a rejection may, for example, occur through a "TCAP abort" (transmission capability applications part), through a "System Failure," through an "Unexpected Data Value," or through ignoring the Update Location procedure.

Additional rejection options are possible but will not be named in detail here.

One exception is the rejection by means of a "Roaming Not Allowed" message.

In this case, no repetition of the Update Location takes place from the mobile device and the rejected PLMN (public land mobile network) code is entered on the "forbidden list" in the SIM card.

The interval for each Update Location process is approximately 15 seconds.

However, there are, at times major, differences in process intervals among different suppliers of mobile devices (cellular telephone.)

If no rejection occurs, the mobile telephone repeats the Update Location process after approximately 30 seconds.

After altogether four rejections, the mobile device, if it is in an automatic mode, selects a different PLMN.

If the fourth Update Location attempt of the same PLMN is without success, the roaming-steering server will accept the fifth attempt, since is presumed that the mobile telephone is in Manual Network Selection mode.

If the anti-steering server detects that the HLR of the roaming partner does not reply, or that it rejects the Update Location, the anti-roaming-steering server sends three times an Update Location message to the steering server in the foreign mobile network.

These messages will probably also be rejected by the steering server, but they will be counted.

The three Update Location messages from the anti-steering server must be sent to the foreign mobile network within approximately 20 seconds (depending on the implementation in the mobile device). In the direction of the mobile telephone the anti-steering server does not send a rejection.

A first exemplary embodiment of the application of an anti-roaming steering method is described in detail below.

Up to now, the roaming-steering server of the foreign mobile network operator intercepts the Location Update message from the national mobile network and rejects the Location Update attempt with an error message.

Included in the error message is a standardized reason, which is identified, for example, as "TCAP abort," "System Failure," "Unexpected Data Value," "Roaming Not Allowed," "Unknown Subscriber".

The mobile device (cellular telephone) subsequently attempts up to four times to perform a renewed Location Update in the visitor cellular network, which is again rejected by the steering server of the roaming partner with an error message in each case.

After no more than four unsuccessful Location Update attempts, the mobile device switches to a different mobile network of the visited country. With that, the registration with the national mobile network was prevented in favor of a higher prioritized mobile network.

A essential element of the inventive exemplary embodiment of a method for anti-roaming steering is the detection of the error messages with the message "TCAP abort," "System Failure," "Unexpected Data Value," Roaming Not Allowed," Unknown Subscriber," through the use of an anti-steering server.

These rejections of the registration process are not forwarded to the mobile device.

The anti-steering server simulates repeated attempts of a Location Update within a certain time span.

For the home network of the foreign cellular subscriber it is thus being signaled that the cellular subscriber manually selected the national mobile network in his mobile device.

Since the home network operator is interested in its customer being able to register in a visited country, in order to generate fees from telecommunication services, it will, after no more than three to five unsuccessful Location Update attempts permit the registration with the national mobile network of the visited country.

The successful acknowledgement of the Location Update is transmitted to the mobile network of the foreign cellular subscriber. The customer has thus successfully registered with the national mobile network.

The method according to the first exemplary embodiment accordingly has the following process steps:

The Update Location message is routed via an anti-steering server in the national mobile network.

This Location Update attempt is intercepted by the steering server of the roaming operator and rejected with an error message back into the national mobile network.

The anti-steering server detects the error message and a determination is made in a database of the anti-steering server of the national mobile network, as to whether and with which procedure an anti-steering is being performed.

If an anti-steering is being performed, the error message from the steering server of the roaming operator is intercepted in the anti-steering server of the national mobile network and not forwarded to the mobile device.

The anti-steering server of the national mobile network again sends Update Location messages to the roaming operator.

The process steps 2 through 5 are repeated in accordance with the signaling from the steering server of the roaming operator and the anti-steering method of the national mobile network operator.

The transfer of the subscriber data of the foreign mobile network subscriber from the HLR to the VLR is transparently allowed through.

If the Location Update attempt is successfully acknowledged by the home network of the foreign cellular subscriber, the acknowledgement is forwarded to the mobile device—the subscriber has thus successfully registered with the network of the national mobile network.

An additional exemplary embodiment of an inventive anti-steering method is that, in this roaming-steering method, the steering server of the roaming partner intercepts the Update Location message from the national mobile network and does not send a message back to the national mobile network.

The mobile device receives neither an error message nor an acknowledgement. A timer is counting down in the mobile device.

The mobile device then attempts a renewed Location Update in the national mobile network, which, again, is not answered by the steering server of the roaming partner.

After no more than four unsuccessful Location Update attempts, the mobile device switches to a different mobile network of the visited country.

The registration with the national mobile network is thus prevented in favor of a higher prioritized mobile network.

It is an essential element of the above inventive exemplary embodiment of a method for anti-roaming steering that in this method for anti-roaming steering the detection of the absence of a reply from the home network of the foreign cellular customer is through the use of an anti-steering server.

The anti-steering server simulates multiple Location Update attempts within a certain time span.

For the home network of the foreign mobile subscriber it is being signaled that the mobile customer manually selected the national mobile network in his mobile device.

Since the home network operator in interested in its customer being able to register in a visited country, in order to generate fees from telecommunication services, it will, after no more than three to five unsuccessful Location Update attempts permit the registration with the national mobile network of the visited country.

The successful acknowledgement of the Location Update is transmitted to the mobile device of the foreign cellular subscriber. The subscriber has thus successfully registered with the national mobile network.

The method according to the second exemplary embodiment accordingly has the following process steps:

The Update Location message is routed via an anti-steering server in the national mobile network.

This Location Update attempt is intercepted by the steering server of the roaming operator. No reply message is sent into the national mobile network.

The anti-steering server detects the absence of the message. In a database of the anti-steering server of the national mobile network operator, a determination is made as to whether and with which method an anti-steering is to be performed.

If an anti-steering is performed, the anti-steering sever of the national mobile operator sends renewed Update Location messages to the roaming operator.

The process steps 2 through 4 are repeated in accordance with the signaling from the steering server of the roaming operator and the anti-steering method of the national mobile network operator.

The transfer of the subscriber data of the foreign mobile network customer from the HLR to the VLR is transparently allowed through.

If the Location Update attempt is successfully acknowledged by the home network of the foreign cellular subscriber, the acknowledgement is forwarded to the national mobile network—the subscriber has thus successfully registered with the network of the national mobile network operator.

An additional exemplary embodiment for the use of an anti-steering method is that, like in the first method, the roaming-steering server of the foreign mobile network operator intercepts the Update Location message from the national mobile network and rejects the Location Update attempt with an error message.

A standardized protocol in the error message for rejecting a registration is, for example, "TCAP abort," "System Failure," "Unexpected Data Value," Roaming Not Allowed," "Unknown Subscriber."

An essential element of this inventive exemplary embodiment of a method for anti-roaming steering is the detection of the error messages with the reasons "TCAP abort," "System Failure," "Unexpected Data Value," Roaming Not Allowed," "Unknown Subscriber," through the use of an anti-steering server.

These rejections of the registration attempt are not forwarded to the mobile device.

The anti-steering server simulates a successful acknowledgement of the Location Update in the direction of the mobile device.

From the view of the mobile device, a successful Location Update is thus registered.

In this method no subscriber data is transmitted from the HLR to the VLR.

The cellular subscriber, therefore, is unable to use any telecommunication services, with the exception of emergency calls.

Merely the registration with other mobile networks in a visited country is prevented, in order to, for example, prevent an increased signaling load. If the foreign cellular subscriber wishes to place and receive calls in the visited country, an Update Location message is again sent by the VLR to the home network, which is again treated accordingly by the steering server.

The foreign mobile network operator is free to adapt its roaming steering methods in such a way that its customers can place and receive phone calls again while abroad.

A successful acknowledgement of the Location Update from the home network is transmitted to the mobile device of the foreign customer—the customer successfully registers with the national mobile network and can make unlimited use of the telecommunication services to which he has subscribed.

The method according to the third exemplary embodiment therefore has the following process steps:

The Update Location message is routed via an anti-steering server in the national mobile network.

This Location Update attempt is intercepted by the steering server of the roaming operator and rejected with an error message back into the national mobile network.

The anti-steering server detects the error message and in a database of the anti-steering server of the national mobile network operator a determination is made, as to whether and with which method an anti-steering is to be performed.

If an anti-steering is performed, the error message from the steering sever of the roaming operator is intercepted in the anti-steering server of the national mobile network operator and not forwarded to the mobile device.

The anti-steering server of the national mobile network operator sends to the mobile device of the foreign customer a simulated successful acknowledgement of the Location Update attempt. This results in a faked "Location Update Accept."

The invention will be described in detail below in conjunction with drawings showing a number of embodiments. Additional characteristics that are essential to the invention and advantages of the invention will become apparent from the drawings and from their description.

In the drawings:

FIG. 2 shows a schematic illustration of a method according to exemplary embodiment 2

FIG. 3 shows a schematic illustration of a method according to exemplary embodiment 3.

Figure 1:
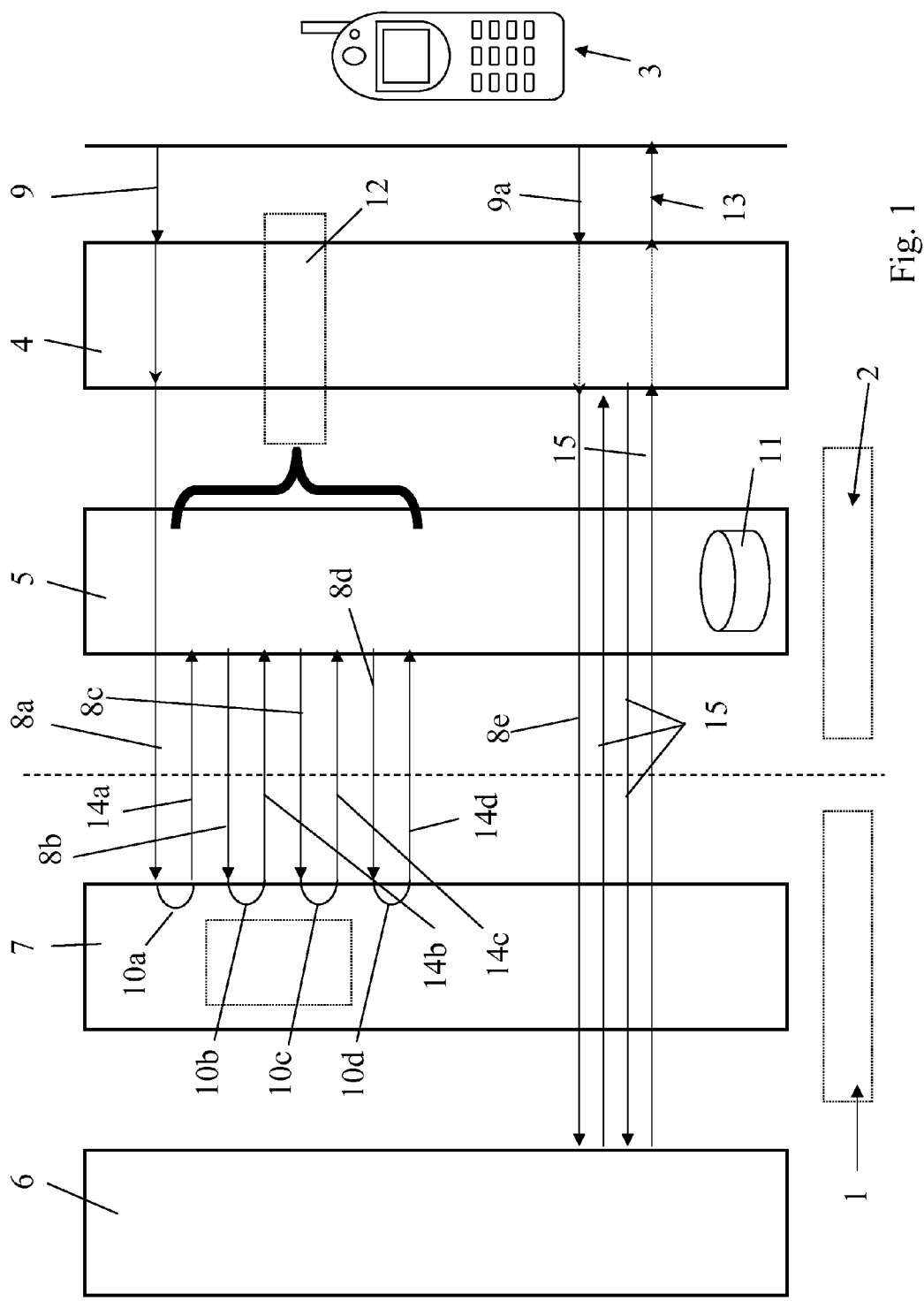
FIG. 1 shows a schematic illustration of a method according to exemplary embodiment 1

The method presented in FIG. 1 shows the anti-steering method according to the first exemplary embodiment between a mobile network of a foreign mobile network operator 1 (roaming operator) and a national mobile network operator 2 (e.g. T-Mobile International AG.)

Generally, the roaming process makes it possible to use a mobile device 3, such as for example a cellular telephone, in a foreign mobile network.

This is possible only if a so-called roaming agreement for mutual billing of services exists between the foreign and the national mobile network operator 1, 2.

If, for example, a cellular subscriber of a non-national (foreign) mobile network operator 1 is located with his mobile device 3 within the area of a national mobile network operator 2, an attempt is made by the mobile device 3 to perform a roaming process.

To this effect, the mobile device 3 registers with a corresponding signal in a visitors location register 4.

For the purposes of such a registration, an Update Location message 8a in the form of a query 9 is sent by the visitors location register VLR 4 to the home location register HLR 6.

This Update Location message triggers an Update Location procedure in the home location register HLR 6, causing a stored subscriber dataset to be transmitted from the home location register HLR 6 to the visitors location register VLR 4. This Update Location procedure is then acknowledged by the home location register HLR 6 once it is successfully completed.

Beyond that, the Update Location is performed altogether four times, initiated from the mobile device 3, should an accepted registration 13 of the foreign mobile device 3 be rejected.

Such rejections are triggered, for example, by a transaction capabilities application abort of a registration, by system errors, by unexpected data values, or through ignoring of the registration process, or the like.

A special rejection feature is the rejection of a registration of a mobile device 3 in a non-national mobile network through a "Roaming Not Allowed" message.

Here, no repetition of an Update Location takes place after such a message has been received, and a PLMN code is entered on a forbidden list on the SIM card of the mobile device 3.

If the mobile device 3 is in automatic network selection mode, it selects after four rejections a different national mobile network 2 for the registration.

The Location Update message from the national mobile network 2 is intercepted by a roaming-steering server 7 that is installed in the mobile network of the foreign mobile network operator 1 and rejected with an above-mentioned error message 14a through 14d.

This process is carried out a total of four times.

After the fifth query 9a, the mobile device 3 directs its query to a different national mobile network and in favor of one that is higher prioritized.

The anti-steering server 5 in the national mobile network 2 simulates repeated attempts of a Location Upgrade [sic] within a certain time span, causing the home network 1 of the foreign cellular subscriber to register a manual network selection in the mobile device 3 and to permit the registration of the mobile network 3 in the national mobile network 2 of the visited country.

This is followed by an acknowledgement of the registration with the national mobile network 2 to the foreign mobile network 1.

The method shown in FIG. 2 shows that all Update Location messages 8a through 8d coming from the foreign mobile device 3 from the national mobile network 2 [are] intercepted by the steering server 7 of the roaming partner and sends [sic] back no error message or acknowledgement to the national mobile network 2, while a timer is counting down in the mobile device 3.

The absence of error messages or acknowledgements from the home network 1 of the foreign cellular subscriber is detected with the use of a nationally installed anti-steering server 5, which, in turn, simulates repeated Location Update attempts within a certain time span and simulates to the home network 1 of the foreign cellular subscriber a manual mobile network selection by the mobile device 3.

The foreign cellular subscriber is thus registered with the prioritized mobile network of the national mobile network 2.

The method shown in FIG. 3 shows a method that proceeds similarly similar to FIG. 1.

Here, too, the roaming-steering server 7 of the foreign mobile network operator 1 intercepts the Update Location message from the national mobile network 1 and rejects the Location Update attempt with an error message 14a through 14d.

The anti-steering server 5 detects the corresponding error messages 14a through 14d and simulates a successful acknowledgement of the Location Update in the direction of the mobile device 3.

From the view of the mobile device 3, a successful Location Update is thus registered and an accepted registration 13 of the mobile device 3 with the national mobile network 2 takes place.

In this method no subscriber data is transmitted from the home location register HLR 6 to the visitors location register VLR 4, with the result that the cellular subscriber is unable to use any telecommunication services, with the exception of emergency calls.

A registration with a national mobile network 2 in a visited country are [sic] prevented, in order to prevent a higher signaling load.

During the attempt to establish a mobile radio connection, a renewed Update Location message is sent from the visitors location register VLR 4 to the home network 1 and treated accordingly by the anti-steering server 5.

A successful acknowledgement of the Location Update from the home network 1 is transmitted to the mobile device 3 of the foreign customer—the customer successfully registers with the national mobile network 2 and can make unlimited use of the telecommunication services to which he has subscribed.

After repeated Location Update attempts the mobile device 3 switches to a higher prioritized national mobile network 2.

List of Reference Numerals 1. foreign mobile network operator (roaming operator)
2. national mobile network operator (e.g. T-Mobile International AG)
3. mobile device
4. visitors location register VLR
5. anti-steering server
6. home location register HLR
7. steering server
8. registration process      8a, 8b, 8c, 8d, 8e
9. query      9a
10. rejection      10a, 10b, 10c, 10d
11. database
12. time span
13. accepted registration of a mobile device with a national mobile network
14. error message      14a, 14b, 14c, 14d
15. acknowledgement

What is claimed is:

1. A method for blocking roaming-steering mechanisms, wherein the method carries out a registration of a foreign cellular mobile telephone device (3) with a national visited mobile network (2) if a roaming agreement exists between a foreign and the national mobile network operator for mutual billing of mobile radio services, wherein an anti-roaming-steering server (5) that is installed in the nationally visited mobile network (2) detects manipulated error messages (14a through 14d) and, by means of a suitable influence on signaling processes, performs a targeted manipulation of the registration process (8a through 8d) of foreign cellular subscribers, wherein an Update Location message is routed via an anti-roaming steering server (5) in the national visited mobile network (2), a roaming steering server (7) of the foreign mobile network (1) intercepts the Update Location message from the national visited mobile network (2) and rejects a Location Update attempt with the error message (14a-14d), the anti-roaming steering server (5) detects at least one of the error messages, and in a database of the anti-roaming steering server (5) of the national visited mobile network operator a determination is made as to whether and with which method an anti-roaming steering is to be performed, and if an anti-roaming steering is to be performed, the error message from the roaming steering sever (7) of the operator of the foreign mobile network (1) is intercepted in the anti-roaming steering server (5) of the national visited mobile network operator and not forwarded to the cellular mobile telephone device (3), the anti-roaming steering server (5) of the national visited mobile network operator sends to the cellular mobile telephone device (3) of the foreign customer a simulated successful acknowledgement of the Location Update attempt that results in a faked "Location Update Accept", wherein no subscriber data is transmitted from a home location register HLR (6) of the foreign mobile network (1) to a visitors location register VLR (4) of the national visited mobile network (2), with the result that the cellular subscriber is unable to use any telecommunication services, with the exception of emergency calls, and a registration with the national visited mobile network (2) is prevented in order to prevent a higher signaling load.

2. A method according to claim 1, characterized in that a registration process (8*a* through 8*e*) of the foreign mobile device (3) that is located in a mobile network (2) that is foreign to the mobile device (3), is performed by means of a query (9, 9*a*) via an anti-steering server (5) that is installed in the national mobile network (2).

3. A method according to claim 1, characterized in that the anti-steering server (5) sends Update Location messages in the national mobile network (2) to the roaming operator in accordance with the signaling from the steering server (7) and the anti-steering method of the national mobile network operator (2).

4. A method according to claim 1, characterized in that a the home location register HLR (6) transparently transfers the subscriber data of the foreign cellular subscriber to the visitors location register VLR (4).

5. A method according to claim 1, characterized in that after a successful acknowledgement of a Location Update attempt by the foreign mobile network (1), this acknowledgement is forwarded to the mobile device (3) and a registration of the mobile device (3) with the national mobile network (2) takes place.

6. A method according to claim 1, characterized in that the steering server (7) of the foreign mobile network (1) intercepts the Update Location message from the national mobile network (2) and prevents the sending of error messages (14*a* through 14*d*) or of an acknowledgement to the national mobile network (2).

7. A method according to claim 1, characterized in that after sending a first Update Location message from the mobile device (3), a timer starts to count down in it that triggers a repeated sending of an Update Location message from the mobile device (3).

8. A method according to claim 1, characterized in that the repeated sending of Update Location messages from the mobile device (3) is carried out altogether four times within a certain time span (12), and the mobile device (3), after these attempts switches to another mobile network in favor of a higher prioritized mobile network provider.

* * * * *